United States Patent
Drake et al.

(10) Patent No.: US 9,600,220 B2
(45) Date of Patent: Mar. 21, 2017

(54) MULTI-DEVICE DISPLAY CONFIGURATION

(71) Applicant: Disney Enterprises, Inc., Burbank, CA (US)

(72) Inventors: Edward Drake, Stevenson Ranch, CA (US); Mark Arana, West Hills, CA (US); Evan Acosta, La Crescenta, CA (US); Alex Chen, La Canada Flintridge, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/718,651

(22) Filed: May 21, 2015

(65) Prior Publication Data

US 2015/0254045 A1   Sep. 10, 2015

Related U.S. Application Data

(63) Continuation-in-part of application No. 14/012,756, filed on Aug. 28, 2013, now Pat. No. 9,224,358.
(Continued)

(51) Int. Cl.
*G06F 3/14* (2006.01)
*G09G 5/12* (2006.01)
(Continued)

(52) U.S. Cl.
CPC .......... *G06F 3/1446* (2013.01); *G06F 3/1423* (2013.01); *G06F 3/1438* (2013.01);
(Continued)

(58) Field of Classification Search
CPC .... G06F 3/1423; G06F 3/1438; G06F 3/0346; G06F 3/1446; G09G 2356/00; G09G 2370/04; G09G 2370/10; G09G 2370/16; G09G 5/003; G09G 5/006; G09G 2300/026; G09G 5/12; H04B 5/02; G06Q 30/0261; G06Q 30/0267; G06Q 30/0623;
(Continued)

(56) References Cited

U.S. PATENT DOCUMENTS

| | | | |
|---|---|---|---|
| 2002/0197993 A1* | 12/2002 | Cho | H04L 29/06 455/435.1 |
| 2008/0114836 A1* | 5/2008 | Zellner | G06Q 30/06 709/206 |

(Continued)

*Primary Examiner* — Hong Zhou
(74) *Attorney, Agent, or Firm* — Patent Ingenuity, P.C.; Samuel K. Simpson

(57) ABSTRACT

A process provides a multi-device display configuration. The process receives, at a master device, one or more device parameters from a plurality of display devices. The process also determines, at the master device, an arrangement of the plurality of display devices that provides a multi-device display. Further, the process sends, from the master device, one or more display indicia to the plurality of display devices that each of the plurality of display devices displays to allow one or more users to position the plurality of display devices in the arrangement. The process sends, from the master device, a first portion of the content to a first display device, and a second portion of the content to a second display device for the first and second display devices to simultaneously display the first and second portions of the content.

19 Claims, 17 Drawing Sheets

Related U.S. Application Data

(60) Provisional application No. 61/766,065, filed on Feb. 18, 2013.

(51) Int. Cl.

| | | |
|---|---|---|
| *G09G 5/00* | (2006.01) | |
| *G06Q 30/06* | (2012.01) | |
| *G06Q 30/02* | (2012.01) | |
| *G06F 3/0346* | (2013.01) | |

(52) U.S. Cl.
CPC ..... *G06Q 30/0261* (2013.01); *G06Q 30/0267* (2013.01); *G06Q 30/0623* (2013.01); *G06Q 30/0625* (2013.01); *G09G 5/003* (2013.01); *G09G 5/12* (2013.01); *G06F 3/0346* (2013.01); *G09G 2300/026* (2013.01); *G09G 2370/04* (2013.01); *G09G 2370/10* (2013.01); *G09G 2370/16* (2013.01)

(58) Field of Classification Search
CPC ........... G06Q 30/0625; G06Q 30/0269; G06Q 30/0631; G06Q 30/0639; H04N 9/87
USPC ................................... 345/1.1, 1.3, 156–173
See application file for complete search history.

(56) References Cited

U.S. PATENT DOCUMENTS

| | | | |
|---|---|---|---|
| 2010/0144283 A1* | 6/2010 | Curcio | G06F 1/1626 455/66.1 |
| 2010/0268779 A1* | 10/2010 | Rao | H04L 65/1069 709/206 |
| 2010/0328447 A1* | 12/2010 | Watson | G06F 3/1446 348/135 |
| 2011/0055901 A1* | 3/2011 | Karaoguz | G06F 21/10 726/4 |
| 2013/0109349 A1* | 5/2013 | Iyengar | H04L 63/083 455/411 |
| 2013/0325952 A1* | 12/2013 | Draznin | H04N 21/4126 709/204 |
| 2014/0302773 A1* | 10/2014 | Jantunen | H04W 8/005 455/3.01 |

* cited by examiner

MULTI-DEVICE DISPLAY CONFIGURATION

RELATED APPLICATIONS

This application is a Continuation-In-Part application of U.S. patent application Ser. No. 14/012,756, filed on Aug. 28, 2013, entitled PROXIMITY-BASED MULTI-DISPLAY CONFIGURATION, which claims priority to U.S. Provisional Patent Application Ser. No. 61/766,065, filed on Feb. 18, 2013, entitled TRANSFERENCE OF DATA TO PROVIDE CONTENT, all of which are hereby incorporated by reference in their entireties.

BACKGROUND

1. Field

This disclosure generally relates to the field of data transference.

2. General Background

With advances in technology, mobile devices, e.g., smartphones, tablet devices, and the like, provide users with the ability to view content that was previously viewed only on display devices with larger display screens, e.g., televisions, computer monitors, movie screens, and the like. As a result, users may now enjoy watching their favorite movies, television shows, and various other video or image content on their mobile devices instead of display devices with larger display screens. As many display devices with larger display screens are often stationary devices, users are not constrained to a particular location to watch video content on their mobile devices.

Although mobile devices provide users with the ability to move to various locations and still watch video and image content, the mobile devices are often limited by the size constraints of their corresponding display screens. As a result, users with mobile devices often have a limited viewing experience of video or image content on their mobile devices.

SUMMARY

A process is utilized to provide a multi-display configuration. The process detects, at a first proximity-based device within a first display device, a presence of a second proximity-based device within a second display device. The presence is within a proximity. Further, the process displays a first portion of a multi-display image at the first display device based upon a location of the first display device relative to the second display device.

An apparatus is also provided. The apparatus comprises a first proximity-based device and a first display device. The first proximity-based device is configured to detect a presence of a second proximity-based device within a second display device. The first display device is configured to display a first portion of a multi-display image based upon a location of the first display device relative to the second display device.

Further, a process provides a multi-device display configuration. The process receives, at a master device, one or more device parameters from a plurality of display devices. The process also determines, at the master device, an arrangement of the plurality of display devices that provides a multi-device display. Further, the process sends, from the master device, one or more display indicia to the plurality of display devices that each of the plurality of display devices displays to allow one or more users to position the plurality of display devices in the arrangement. The process sends, from the master device, a first portion of the content to a first display device, and a second portion of the content to a second display device for the first and second display devices to simultaneously display the first and second portions of the content. Alternatively, the process sends, from the master device, display data to the plurality of display devices to allow the plurality of display devices to display corresponding portions of content for the multi-device display based upon the arrangement.

Another process provides a multi-device display configuration. The process receives, at a master device, one or more device parameters from a plurality of display devices. The master device is associated with a user account that provides access to content from a server. Further, the process determines, at the master device, a multi-device display based upon the one or more device parameters. In addition, the process receives, from the server, the content at the master device. The process also provides, at the master device, access to the content to the plurality of display devices. The process sends, from the master device, a first portion of the content to a first display device, and a second portion of the content to a second display device for the first and second display devices to simultaneously display the first and second portions of the content. Alternatively, the process sends, from the master device, display data to the plurality of display devices that indicates which portion of the content each of the plurality of display devices should display as part of the multi-device display.

BRIEF DESCRIPTION OF THE DRAWINGS

The above-mentioned features of the present disclosure will become more apparent with reference to the following description and accompanying drawings, wherein like reference numerals denote like elements and in which.

DETAILED DESCRIPTION

A proximity-based multi-display configuration displays content by having each of a plurality of display devices display a portion of the respective content. For example, four smartphones may be placed together. Each smartphone may display a quarter of the overall image for a particular frame of video content. As a result, the proximity-based multi-display configuration of four smartphones displays video content on an overall display that is four times larger than that of each individual smartphone. Accordingly, a group of users may watch content on a larger display and still have the flexibility of moving from location to location with a mobile device.

Figure 1:
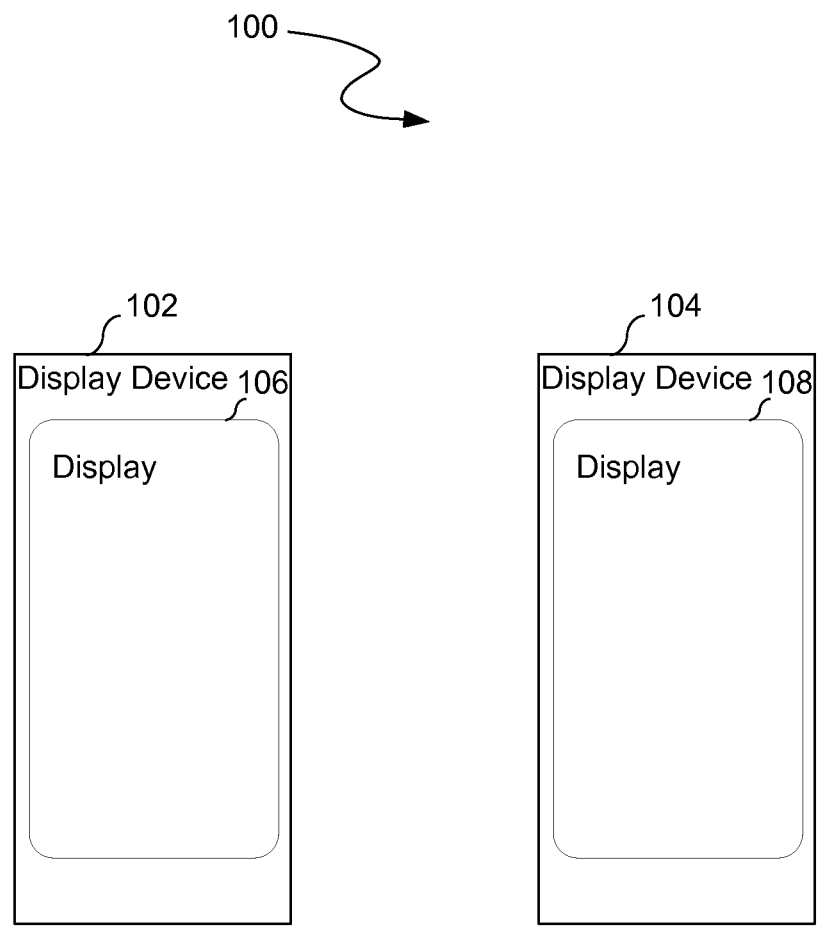
FIG. 1 illustrates a proximity-based multi-display configuration.

FIG. 1 illustrates a proximity-based multi-display configuration 100. The proximity-based multi-display configuration 100 includes a first display device 102 and a second display device 104. The first display device 102 includes a first display 106. Further, the second display device 104 includes a second display 108. Examples of display devices are mobile computing devices, monitors, and the like. A mobile computing device is a smartphone, tablet device, and the like.

The first display device 102 and the second display device 104 are brought within a proximity to each other. By being within the proximity to each other, the display devices 102 and 104 may establish communication with each other. Such communication lets each of the display devices 102 and 104 know the position of each other. As a result, each of the respective display devices is aware of what portion of a particular image to display. For example, each of the display devices 102 and 104 may receive the entirety of a particular frame of a video content. The first display device 102 may inform the second display device 104 that the first display device 102 is on the left side of the second display device 104. Further, the second display device 104 may inform the first display device 102 that the second display device 104 is on the right side of the first display device 102. As a result, the first display device 102 is aware that the first display device 102 should only display the left half of the frame of the video content, whereas the second display device 104 is aware that the second display device 104 should only display the right half of the frame of the video content.

The displays 106 and 108 may be displays that are integrated within the display devices 102 and 104, e.g., smartphone displays. Alternatively, the displays 106 and 108 may be displays that are operably connected to the display devices 102 and 104, e.g., an LED monitor, an LCD monitor, or the like.

Figure 2:
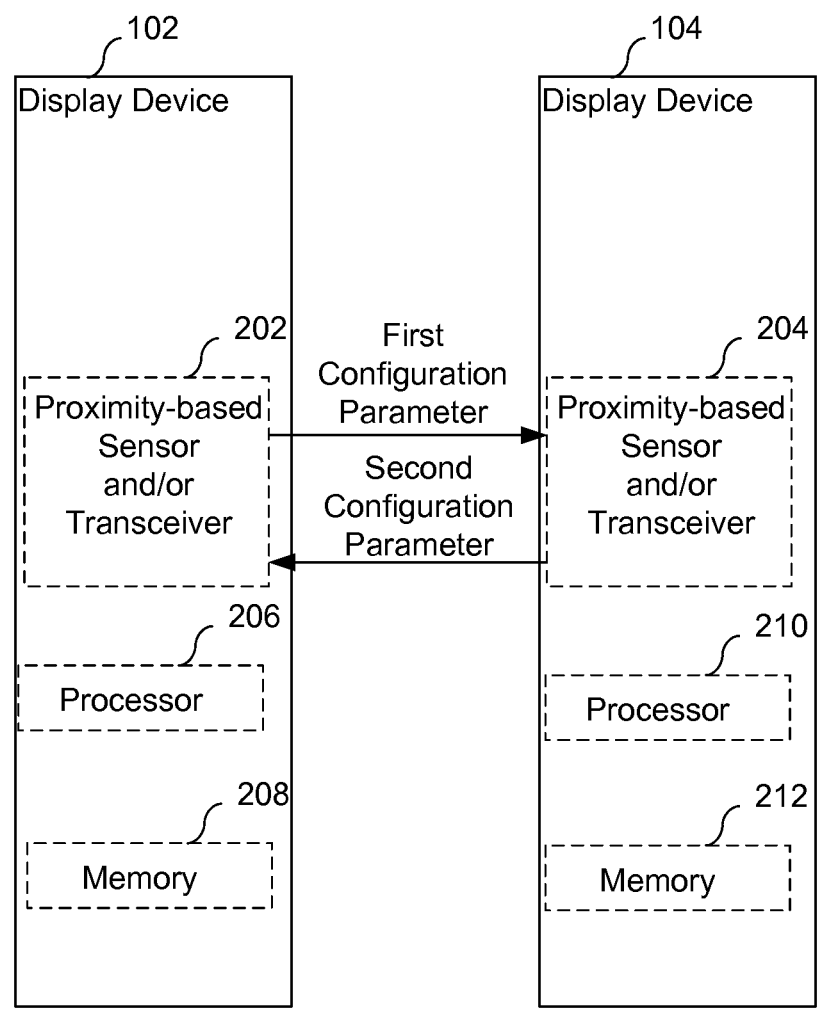
FIG. 2 illustrates the internal components of the first mobile computing device and the second mobile computing device illustrated in FIG. 1.

FIG. 2 illustrates the internal components of the first display device 102 and the second display device 104 illustrated in FIG. 1. The first display device 102 has a first proximity-based sensor and/or transceiver 202. Further, the second display device 104 has a second proximity-based sensor and/or transceiver 204. Examples of a proximity-based sensor and/or transceiver include RFID chip, RFID tag, Near Field Communication ("NFC") chip, NFC tag, Bluetooth, or the like The proximity-based sensor and/or transceivers 202 and 204 may establish radio or other communication with each other based upon one or more standards, e.g., NFC standards.

In one aspect, the first display device 102 determines the presence of the second display device 104. For example, the first proximity-based sensor and/or transceiver 202 may detect the presence of the second proximity-based sensor and/or transceiver 204 within a proximity. Upon detection of the second proximity-based sensor and/or transceiver 204, the first display device 102 determines its position relative to the second display device 104. The first display device 102 then sends a configuration parameter to the second display device 104. In one aspect, the configuration parameter is the relative position of the first display device 102 to the second display device 104. For example, the configuration parameter may state that the first display device 102 is on the left side. In another aspect, the configuration parameter may be screen dimensions, a screen resolution, or dots per inches ("dpi"). In yet another aspect, the configuration parameter may include the relative position, screen dimensions, screen resolution, and/or dpi.

Upon detection of the first proximity-based sensor and/or transceiver 202, the second display device 104 determines its position relative to the first display device 102. The second display device 104 then sends a configuration parameter to the first display device 102. In one aspect, the configuration parameter is the relative position of the second display device 104 to the first display device 102. For example, the configuration parameter may state that the second display device 104 is on the right side.

As a result, each of display devices 102 and 104 is aware of its own position and/or the relative position of the other display device 102 or 104 as received from the other display device 102 or 104. Accordingly, each display device 102 or 104 is aware of the portion of the video content to display, e.g., the display device 102 is aware that it should display the left half portion of the video content, whereas the display device 104 is aware that it should display the right half portion of the video content.

In one aspect, the proximity is predefined. In other words, a predefined distance may be established for which the display devices 102 and 104 have to be with respect to each other in order to establish communication. For example, the predefined distance may be established such that a tap of the display devices 102 and 104 establishes communication. Alternatively, the predefined distance may be a distance that does not have a tap.

In one aspect, the first display device 102 also has a processor 206 and a memory 208. The processor 206 may be utilized to determine the manner in which an image is displayed by the first display device 102. Further, the second display device 104 also has a processor 210 and a memory 212. The processor 210 may be utilized to determine the manner in which an image is displayed by the second display device 104.

Figure 3:
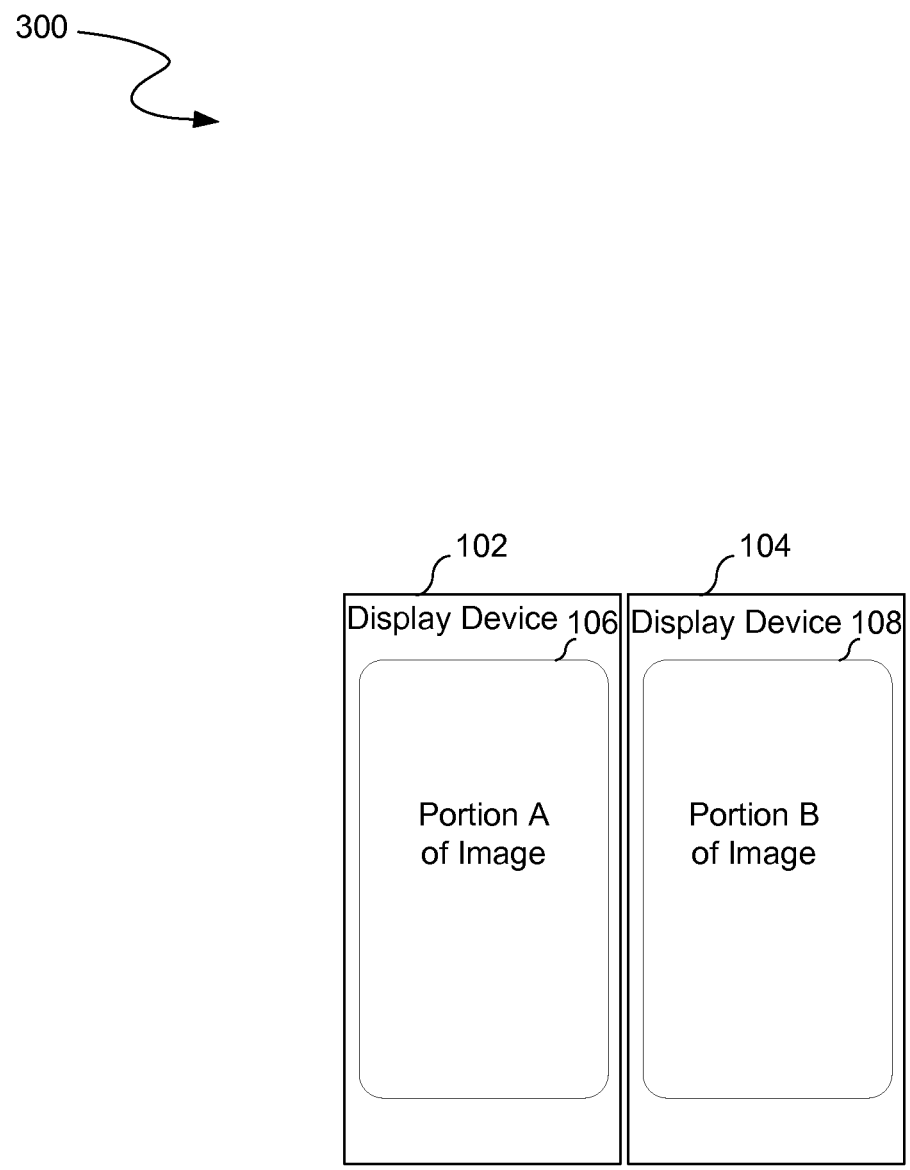
FIG. 3 illustrates the display devices illustrated in FIGS. 1 and 2 being placed next to each other to display a multi-display configuration.

FIG. 3 illustrates the display devices 102 and 104 illustrated in FIGS. 1 and 2 being placed next to each other to display a multi-display configuration 300. The multi-display configuration 300 may also be referred to as a multi-device display configuration that renders a multi-device display, which is a composite image rendered by the display devices 102 and 104. The first display device 102 displays a left portion A. Further, the second display device 104 displays a right portion B. Accordingly, users can place their display devices 102 and 104 together to display video content. By placing their display devices together, the users are able to watch a much larger display of the video content than with the displays 106 and 108 illustrated in FIG. 1 of their individual display devices 102 and 104.

In one aspect, the display devices 102 and 104 are wireless devices. In another aspect, the display devices are connected through a wireline connection.

Figure 4:
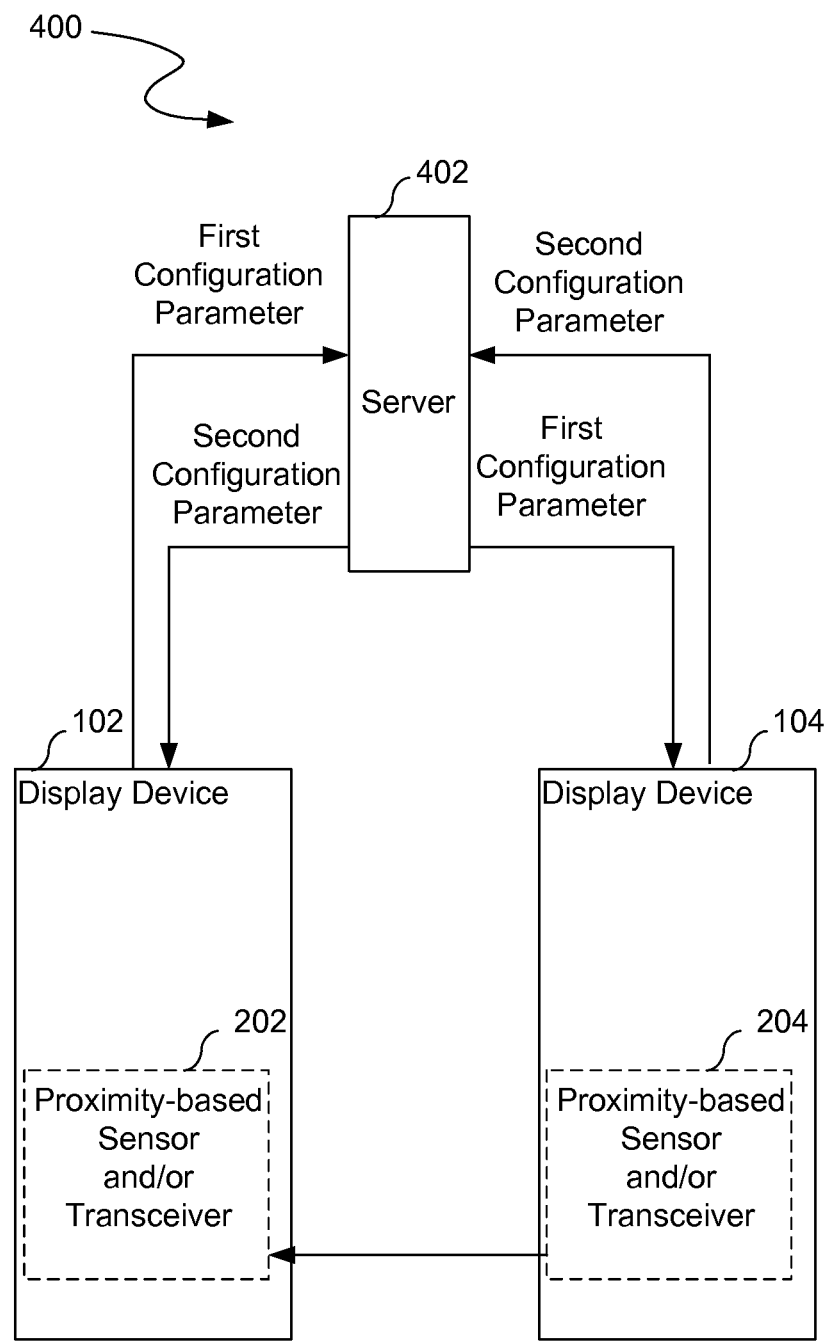
FIG. 4 illustrates a multi-display configuration in which a server is utilized to provide configuration parameters between the first display device and the second display device.

FIG. 4 illustrates a multi-display configuration 400 in which a server 402 is utilized to provide configuration parameters between the first display device 102 and the second display device 104. Rather than the display devices 102 and 104 providing configuration parameters between each other, the display devices 102 and 104 send and receive configuration parameters to and from the server 402. For example, the first display device 102 sends a configuration parameter, e.g., the position of the first display device 102 with respect to the second display device 104, to the server 104. The server 402 then sends that configuration parameter to the second display device 104. As another example, the second display device 104 sends a configuration parameter, e.g., the position of the second display device 104 with respect to the first display device 102, to the server 104. The server 104 then sends that configuration parameter to the first display device 102.

In one aspect, the server 402 provides the various configuration parameters to and from each of the display devices 102 and 104. In other words, the server 402 retransmits all device configurations to the display devices 102 and 104. The display devices 102 and 104 then determine which respective portions of the image to display based upon the configuration parameters.

In another aspect, the server 402 determines the multi-display configuration 400. In other words, the server 402 determines the portion of the image that is displayed on each of the devices 102 and 104. For example, the server 402 may inform the first display device 102 that the left portion of the image should be displayed by the first display device 102, whereas the server 402 may inform the second display device 104 that the right portion of the image should be displayed by the second display device 104. The server 402 may provide the respective portions of the image to the display devices 102 and 104 or inform the display devices 102 and 104 which portions of the overall image should be displayed.

In one aspect, the display devices 102 and 104 receive the entire content display but only display the corresponding portion of the multi-display configuration. In another aspect, the display devices 102 and 104 only receive the corresponding portions of the content for the multi-display configuration. For example, the server 402 may send the left half of the content to the display device 102 and the right half of the content to the display device 104.

Figure 5:
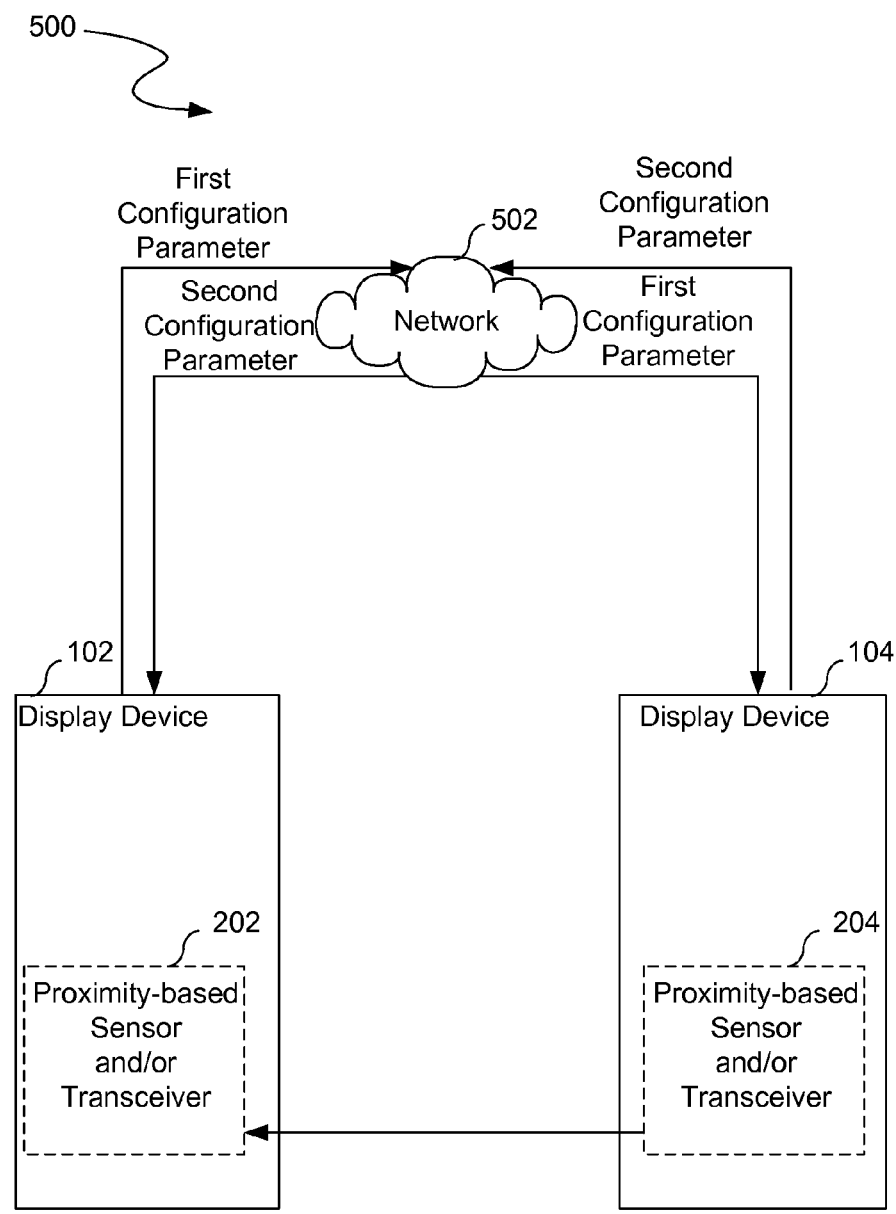
FIG. 5 illustrates a multi-display configuration in which a network is utilized to provide configuration parameters between the first display device and the second display device.

FIG. 5 illustrates a multi-display configuration 500 in which a network 502 is utilized to provide configuration parameters between the first display device 102 and the second display device 104. Rather than the display devices 102 and 104 providing configuration parameters between each other, the display devices 102 and 104 send and receive configuration parameters to and from the network 502. For example, the first display device 102 sends a configuration parameter, e.g., the position of the first display device 102 with respect to the second display device 104, to the network 502. The network 502 then sends that configuration parameter to the second display device 104. As another example, the second display device 104 sends a configuration parameter, e.g., the position of the second display device 104 with respect to the first display device 102, to the network 502. The network 502 then sends that configuration parameter to the first display device 102.

In one aspect, the network 502 allows the first display device 102 and the second display device 104 to broadcast their respective configurations parameters. Each of the display devices 102 and 104 broadcasts its particular configuration parameter to the network 502. Each of the display devices 102 and 104 listens to the network 502 for configuration parameters and updates from the other display device 102 or 104.

Figure 6:
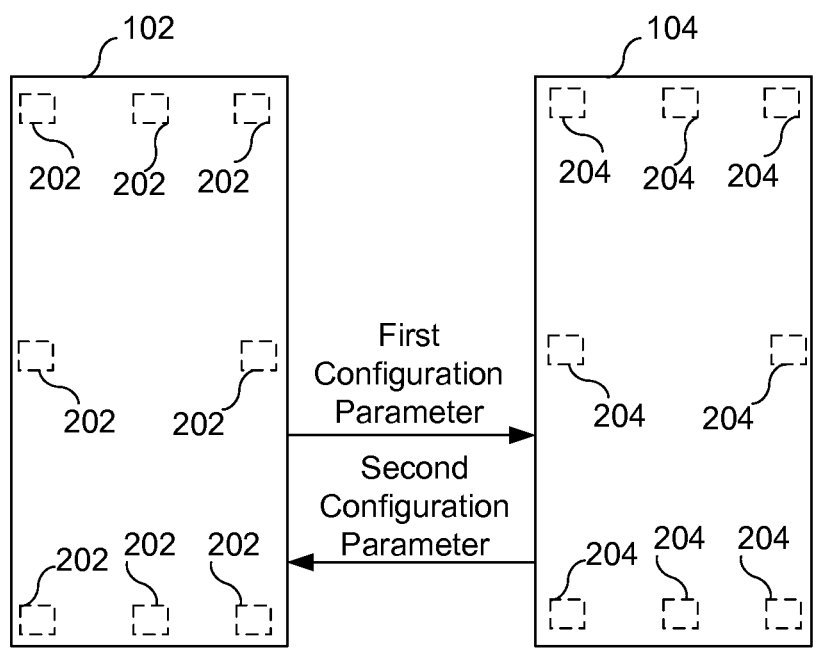
FIG. 6 illustrates the internal components of the display devices illustrated in FIG. 2 having proximity-based sensors and/or transceivers located along the sides and corners of the display devices.

In an alternative configuration from the internal components of the first display device 102 and the second display device 104 illustrated in FIG. 2, a variety of quantities (two or more) of proximity-based sensors and/or transceivers 202 and 204 may be utilized. FIG. 6 illustrates the internal components of the first display device 102 illustrated in FIG. 2 having proximity-based sensors and/or transceivers 202 located along the sides and corners of the display device 102. Further, FIG. 6 illustrates the internal components of the second display device 104 illustrated in FIG. 2 having proximity-based sensors and/or transceivers 204 located along the sides and corners of the second display device 104.

A subset or all of the proximity-based sensors and/or transceivers 202 may be utilized to assess the relative position of the first display device 102 with respect to the second display device 104. For example, a subset or all of the proximity-based sensors and/or transceivers 202 may determine that the first display device 102 is to the left of the second display device 104 by calculating the signal intensity (signal strength) of communications with a subset or all of the proximity-based sensors and/or transceivers 204. Factors in addition to or in place of signal intensity may alternatively be utilized. Although the sides and corners are illustrated in FIG. 6 as positions for the proximity-based sensors and/or transceivers 202 and 204, various other positions within the display devices 102 and 104 may alternatively be utilized.

In an alternative configuration, the relative position of the display devices 102 and 104 is determined through location trackers. For example, the first display device 102 may have a first GPS device, whereas the second display device 104 may have a second GPS device. The first GPS device may provide the first display device 102 with location coordinates in a real world coordinate system, whereas the second GPS device may provide the second display device 104 with location coordinates in the real world coordinate system. Each display device 102 and 104 may then send each other their respective real world coordinates.

Figure 7:
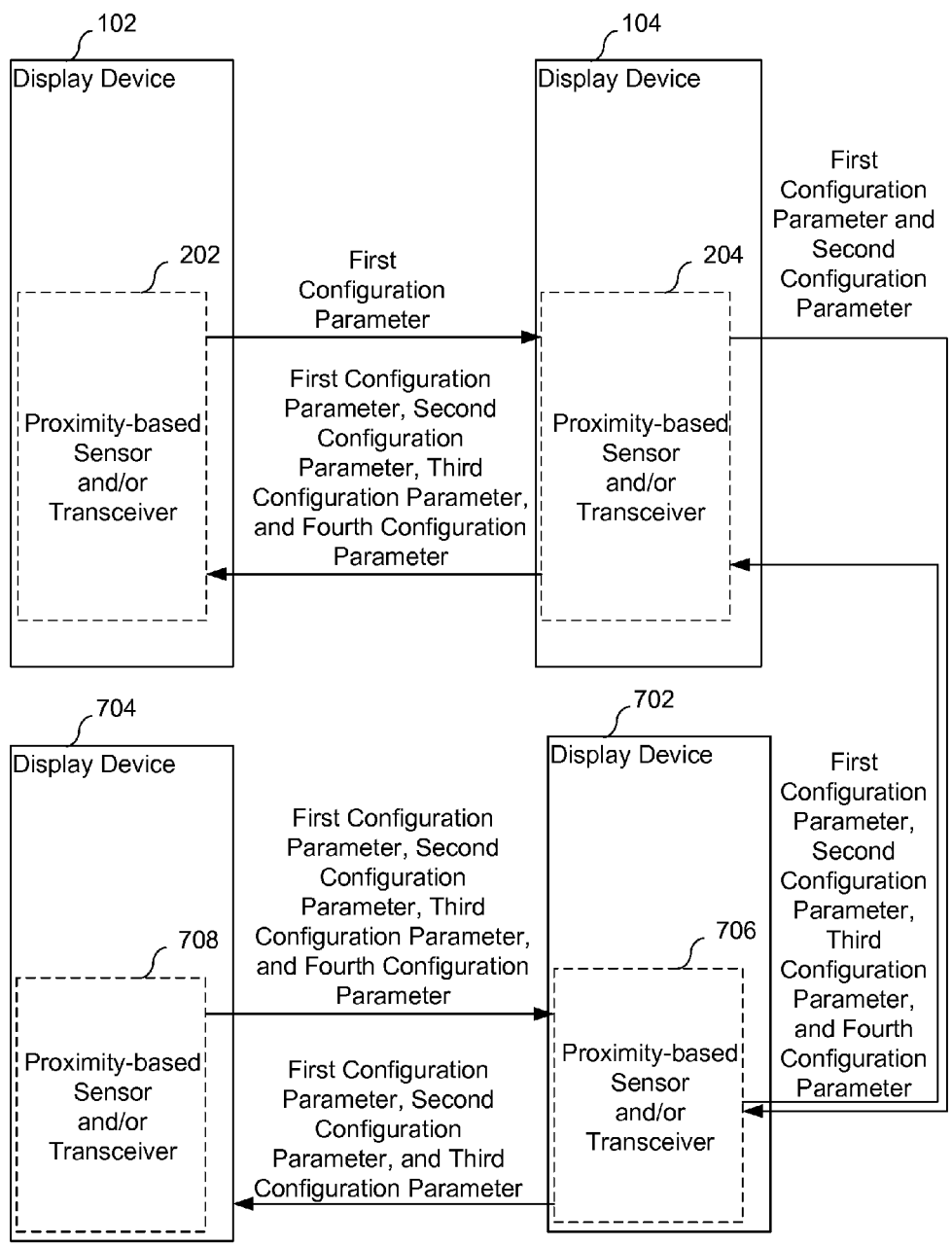
FIG. 7 illustrates an example of the internal components of the first display device, the second display device, a third display device, and a fourth display device.

Although the examples illustrated in FIGS. 1-6 utilize two display devices 102 and 104, more than two display devices may be utilized. For example, four campers may be on a camping trip and want to have a large video display with their four smartphones. FIG. 7 illustrates an example of the internal components of the first display device 102, the second display device 104, a third display device 702, and a fourth display device 704. In one aspect, the display devices 102, 104, 702, and 704 communicate configuration parameters, e.g., their relative positions, through a daisy chain configuration. For example, the proximity-based sensor and/or transceiver 202 in the first display device 102 sends a first configuration parameter to the proximity-based sensor and/or transceiver 204 in the second display device 104. The proximity-based sensor and/or transceiver 204 in the second display device 104 may then send the first configuration parameter along with the second configuration parameter to a proximity-based sensor and/or transceiver 706 in the third display device 702. Further, the proximity-based sensor and/or transceiver 706 in the third display device 702 may then send the first configuration parameter, the second configuration parameter, and the third configuration parameter to a proximity-based sensor and/or transceiver 708 in the fourth display device 704 The fourth display device 704 may then send the first configuration parameter, the second configuration parameter, the third configuration parameter, and the fourth configuration parameter to the third display device 702. The third display device 702 may then send those configuration parameters to the second display device 104. The second display device 104 may then send those configuration parameters to the first display device 102.

As a result, each of the display devices 102, 104, 702, and 704 receives the configuration parameters of the other display devices 102, 104, 702, and 704. Accordingly, the respective display devices 102, 104, 702, and 704 know which portion of the image to display. Although a daisy chain configuration is illustrated in FIG. 7, various other configurations may be utilized for more than two display devices, e.g., a server based system as illustrated in FIG. 4, a network based system as illustrated in FIG. 5, or the like.

In one aspect, discovery of display devices 102, 104, 702, and 704 is performed with a proximity-based configuration such as NFC. For example, a communication protocol may provide that the top side denoted as side one, the right side is denoted as side two, the bottom side is denoted as side three, and the left side is denoted as side four. Further, the display device 102 may be denoted as A, the display device 104 may be denoted as B, the display device 702 may be denoted as C, and the display device 704 may be denoted as D. Display device A and display device B negotiate and make each other aware, i.e., their respective configurations are broadcasted. For example, display device A may broadcast a message of [0, B4, 0, 0] to display device B. Each position in the message corresponds to the first, second, third, or fourth position, e.g., the first position may correspond to the top side, the second position may correspond to the right side, the third position may correspond to the bottom side, and the fourth position may correspond to the left side. Accordingly, the display device A is stating that its configuration is such that there is no relative position to display device B for the first, third, and fourth positions, but has the second position, e.g., the right position, adjacent to B4, i.e., the left position of the display device B. In other words, display device A is stating that its right side is next to the left side of display device B. Further, display device B may broadcast a message of [0, 0, 0, A2] to display device A. The display device B is stating that its configuration is such that there is no relative position to display device A for the first, second, and third positions, but has the fourth position, e.g., the left position, adjacent to A2, i.e., the right position of the display device A. In other words, display device B is stating that its left side is next to the right side of display device A.

As a result, the display device A is aware that it should display the left half of the image whereas the display device B is aware that it should display the right half of the image. The resulting multi-display configuration 300 is illustrated in FIG. 3. Accordingly, display devices may self discover and become aware of the immediate network of display devices.

The communication protocol may also be utilized with more than two display devices as illustrated in FIG. 7. For example, display device A may broadcast [0, B4, D1, 0] to the other display devices, display device B may broadcast [0, 0, C1, A2], display device C may broadcast [B3, 0, 0, D2] to the other display devices, and display device D may broadcast [A3, C4, 0, 0] to the other display devices. As a result, the display devices 102, 104, 702, and 704 would display respective portions of an image according to the positions illustrated in FIG. 7.

In another aspect, an additional message may be composed by each display device 102, 104, 702, and 704. The additional message may comprise the entire architecture. For example, each display device 102, 104, 702, and 704 may additionally broadcast the following message: [A: 0, B4, D1, 0] [B: 0, 0, C1, A2] [C: B3, 0, 0, D2] [D: A3, C4, 0, 0]. This additional message helps provide for efficient multi-display configuration assembly with another multi-display configuration. For example, the message [A: 0, B4, D1, 0] [B: 0, 0, C1, A2] [C: B3, 0, 0, D2] [D: A3, C4, 0, 0] has already been composed to describe the multi-display configuration that results from the arrangement of the display devices 102, 104, 702, and 704 illustrated in FIG. 7. If additional users provide additional display devices to provide yet a larger display than that which results from the four display devices 102, 104, 702, and 704, the new multi-display configuration may utilize the message [A: 0, B4, D1, 0] [B: 0, 0, C1, A2] [C: B3, 0, 0, D2] [D: A3, C4, 0, 0] in combination with another message to form the new multi-display configuration.

The communication protocol format described herein is intended only as an example. Various other types of messaging formats may be utilized for the communication protocol.

Figure 8:
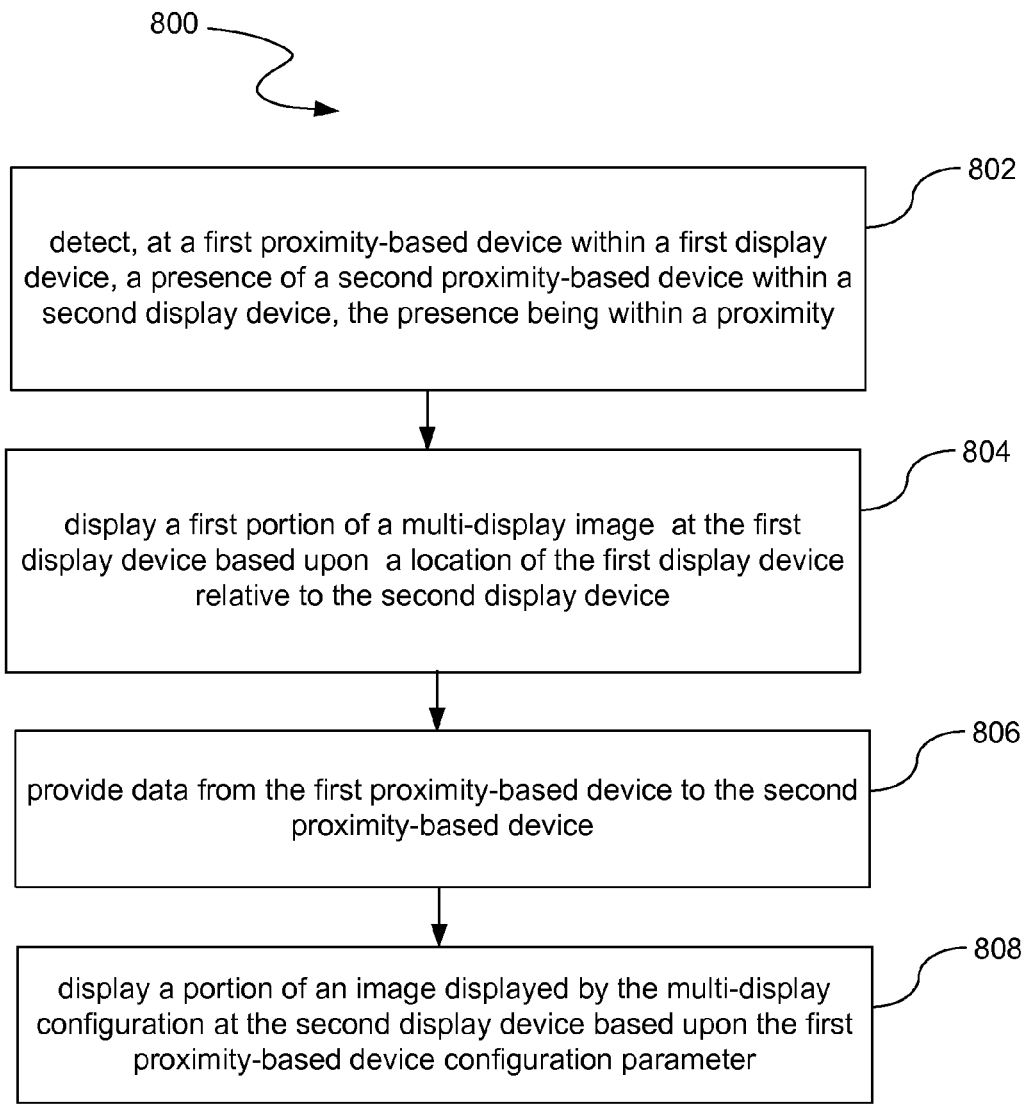
FIG. 8 illustrates a process that may be utilized to provide a multi-display configuration.

FIG. 8 illustrates a process 800 that may be utilized to provide a multi-display configuration. At a process block 802, the process 800 detects, at a first proximity-based device within a first display device, a presence of a second proximity-based device within a second display device. The presence is within a proximity. Further, at a process block 804, the process 800 displays a first portion of a multi-display image at the first display device based upon a location of the first display device relative to the second display device.

The presence is within a proximity. Further, at a process block 806, the process 800 provides data from the first proximity-based device to the second proximity-based device. The data includes a first proximity-based device configuration parameter within a multi-display configuration. In addition, at a process block 808, the process 800 displays a portion of an image displayed by the multi-display configuration at the second display device based upon the first proximity-based device configuration parameter.

Figure 9:
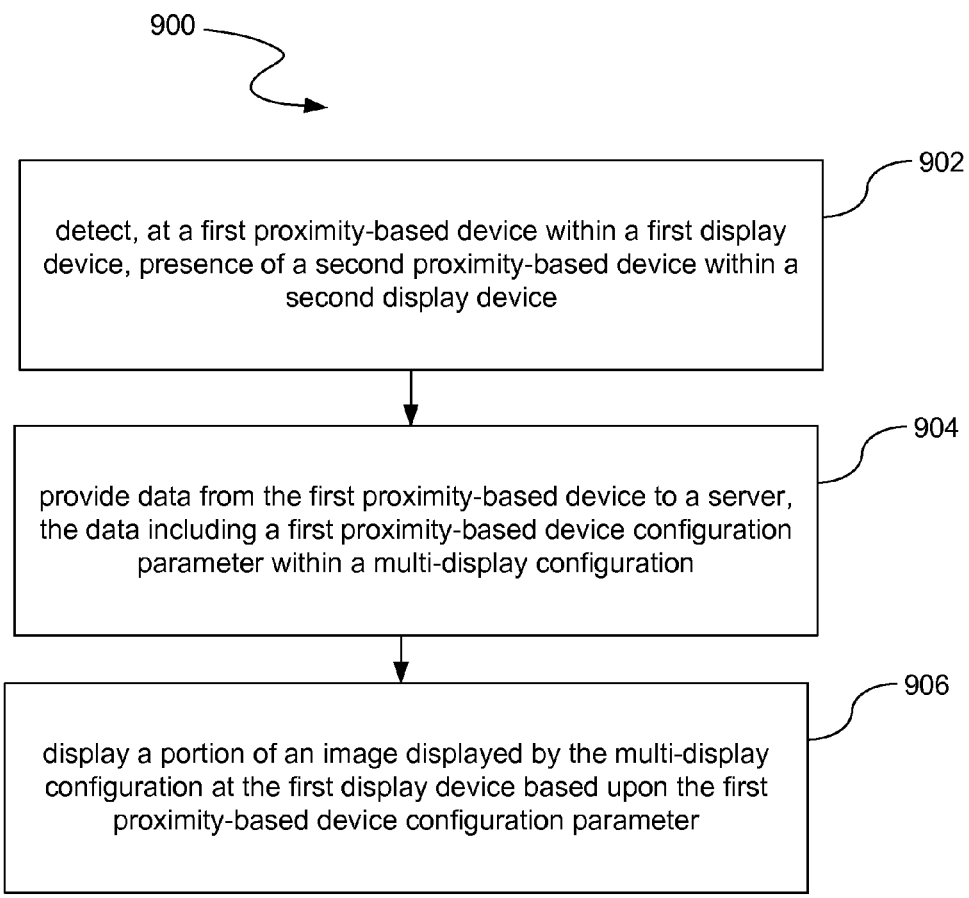
FIG. 9 illustrates an alternative process that may be utilized to provide a multi-display configuration.

Further, FIG. 9 illustrates an alternative process 900 that may be utilized to provide a multi-display configuration. At a process block 902, the process 900 detects, at a first proximity-based device within a first display device, presence of a second proximity-based device within a second display device, the presence being within a proximity. Further, at a process block 904, the process 900 provides data from the first proximity-based device to a server. The data includes a first proximity-based device configuration parameter within a multi-display configuration. At a process block 906, the process 900 displays a portion of an image displayed by the multi-display configuration at the first display device based upon the first proximity-based device configuration parameter. In another aspect, the process 900 receives a second proximity-based device configuration parameter within the multi-display configuration from the server. The first proximity-based device configuration parameter is distinct from the second proximity-based device configuration parameter.

Figure 10:
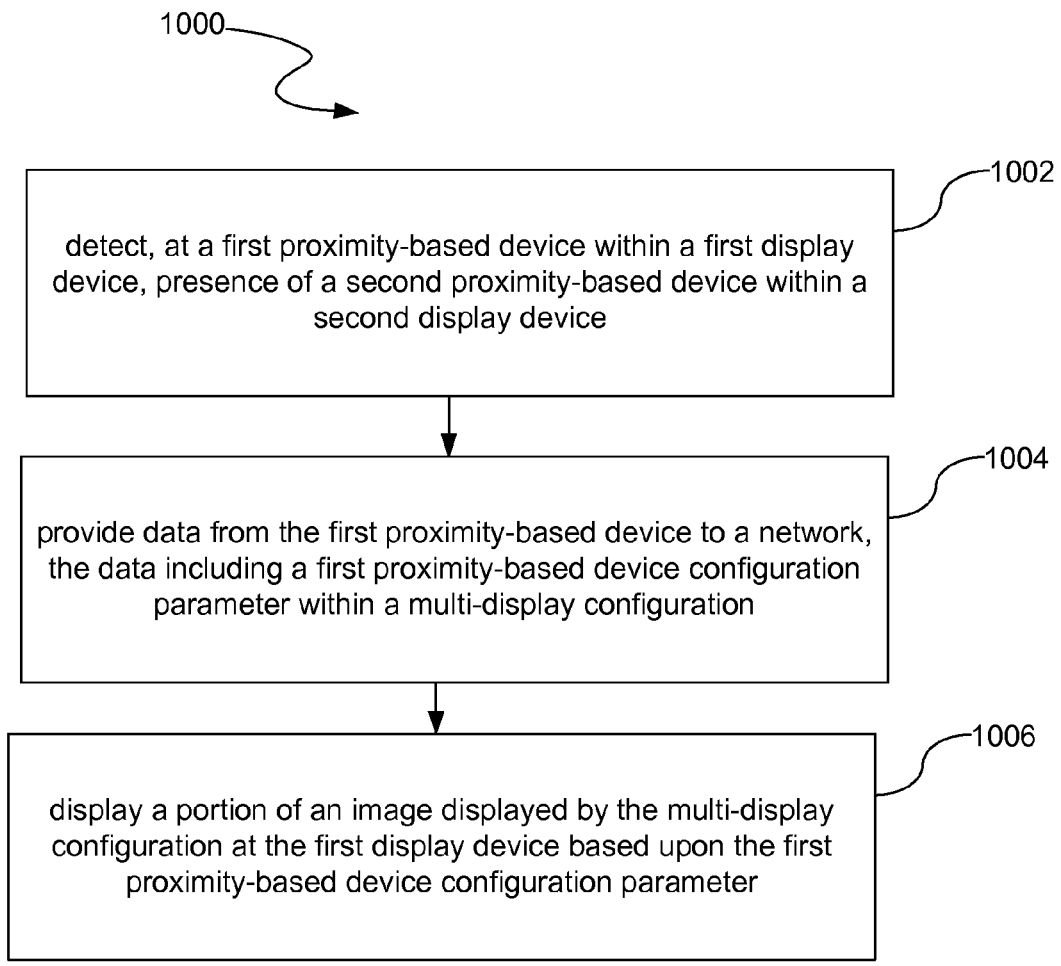
FIG. 10 illustrates yet another alternative process that may be utilized to provide a multi-display configuration.

In addition, FIG. 10 illustrates yet another alternative process 1000 that may be utilized to provide a multi-display configuration. At a process block 1002, the process 1000 detects, at a first proximity-based device within a first display device, presence of a second proximity-based device within a second display device. The presence is within a proximity. Further, at a process block 1004, the process 1000 provides data from the first proximity-based device to a network. At a process block 1006, the process 1000 displays a portion of an image displayed by the multi-display configuration at the first display device based upon the first proximity-based device configuration parameter.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network.

Although a variety of display devices have been illustrated as having similar dimensions, display devices with different dimensions may be utilized. Images may be processed to accommodate different display screen dimensions, different screen resolutions, different dpi, and the like based upon relative positioning of the display devices 102, 104, 702, and 704. For example, two smartphones and two tablet devices may be utilized to form a larger image. Accordingly, a display configuration parameter may be sent according to any of the communication protocols described herein that includes data such as the dimensions of a respective display screen. For example, the four display devices 102, 104, 702, and 704 may be different dimensions. As a result, each display device 102, 104, 702, and 704 would not display one fourth of an image. Each display device 102, 104, 702, and 704 would display a portion based upon the relative screen size in the multi-display configuration. For example, the display devices 102 and 104 may each have a screen size that is one eighth of the overall screen size of the multi-display configuration whereas the display devices 702 and 704 may each have a screen size that is three eighths of the overall screen size of the multi-display configuration. Accordingly, the display devices 102 and 104 each display one eighth of the image whereas the display devices 702 and 704 each display three eighths of the image. In one aspect, the display screen dimensions of other display devices 102, 104, 702, and/or 704 are received as part of the configuration parameter so that a particular display device 102, 104, 702, and/or 704 may determine the respective portion of the image to be displayed based upon the dimensions of the overall multi-display configuration. In another aspect, the server 402 illustrated in FIG. 4 determines the size of the overall multi-display configuration and provides the portions to each of the display devices 102, 104, 702, and 704 for display or informs each of the display devices 102, 104, 702, and 704 which portions to display.

Figure 11:
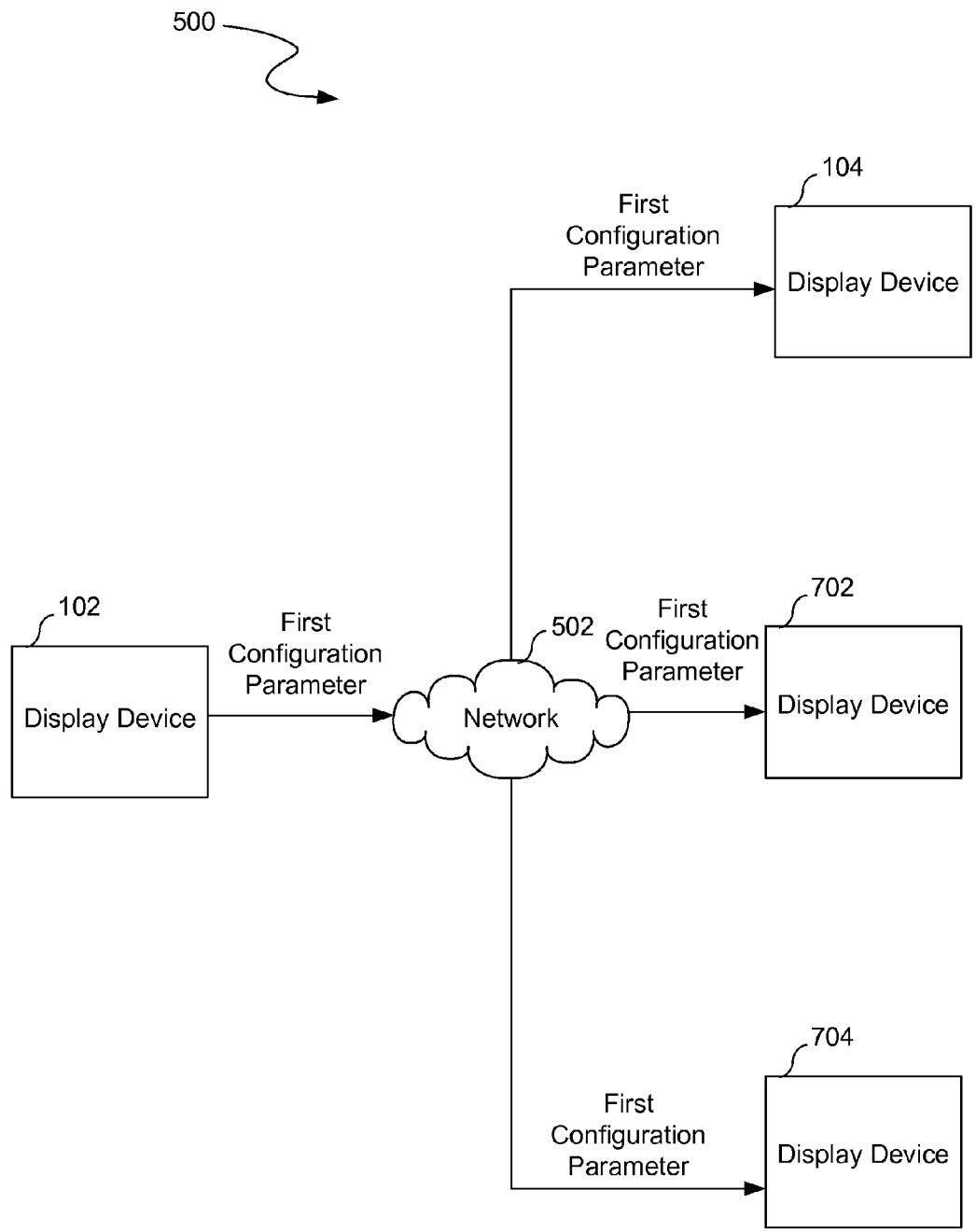
FIG. 11 illustrates the multi-display illustrated in FIG. 5 in which more than two display devices are utilized.

Further, the broadcast configurations described herein may be utilized for more than two display devices. FIG. 11 illustrates the multi-display 500 illustrated in FIG. 5 in which more than two display devices are utilized. The display device 102 provides the first configuration parameter through the network 502, e.g., broadcasts the first configuration parameter, to the second display device 104, the third display device 702, and the fourth display device 704. Further, each of the display devices 104, 702, and 704 may broadcast their own respective configuration parameters to the remaining display devices 102, 104, 702, and/or 704 through the network 502.

In another aspect, alternative configurations may be recommended by the server 402 illustrated in FIG. 4 or the display devices 102, 104, 702, and/or 704 illustrated in FIG. 7 themselves. For example, users may position the display devices 102, 104, 702, and/or 704 in a particular manner such that the first display device 102 is in the upper left position, the second display device 104 is in the upper right position, the third display device 702 is in the lower right position, and the fourth display device 704 is in the lower left position. After such positioning, the server 402 or the display devices 102, 104, 702, and/or 704 themselves may each determine that an alternative multi-display configuration would provide a better viewing experience based upon display screen dimensions, display screen resolutions, dpi, and/or the like. Accordingly, the server 402 or the display devices 102, 104, 702, and/or 704 may each recommend that the users adjust the multi-display configuration to the first display device 102 being in the upper left position, the second display device 104 being in the upper right position, the third display device 704 being in the lower right position, and the fourth display device 702 being in the lower left position.

In the embodiments described herein, a server can determine how an image is split among different display devices. Alternatively, one of the display devices can determine how an image is split among different display devices. A whole image or video may be stored at each display device. Alternatively, a server only transmits a portion of the image or video to each display device.

Figure 12:
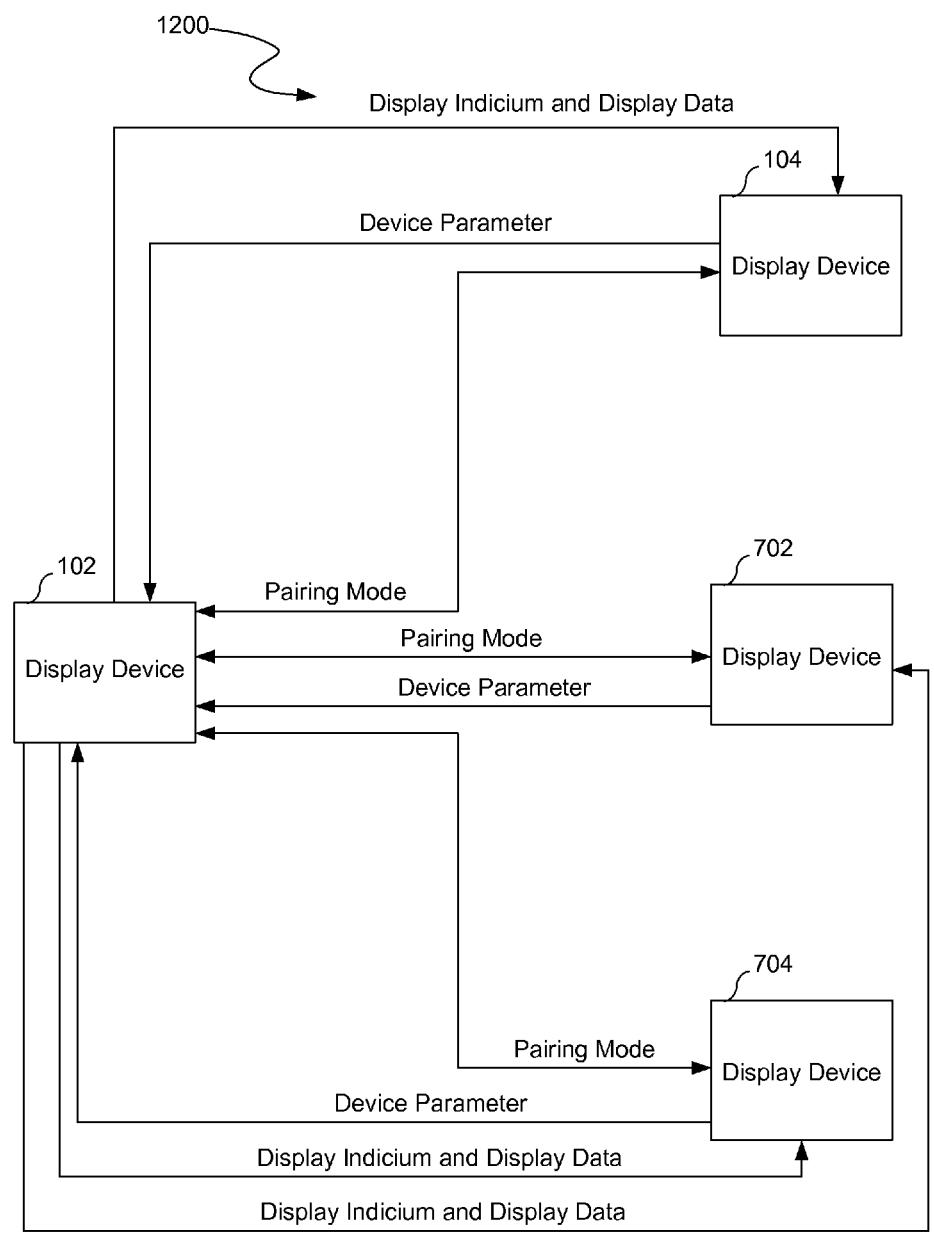
FIG. 12 illustrates a multi-device display pairing configuration.

In another configuration, multiple display devices may be paired to share information to provide a multi-device display. For example, display devices without NFC chips may share information in a pairing mode using wireless communication. FIG. 12 illustrates a multi-device display pairing configuration 1200. The multi-device display pairing configuration 1200 has a master device with which the different display devices are paired to share information. The master device may act as a server or a controller. In one implementation, the master device is one of the display devices 102, 104, 702, or 704 in the multi-device display pairing configuration 1200, e.g., the first display device 102. The master display device 102 establishes a pairing mode with each of the display devices 104, 702, and 704. Pairing mode can be established automatically or manually by a user, e.g., through an operating system setting, an application, etc. In another implementation, the master device is a distinct device from the display devices 102, 104, 702, and 704. In that implementation, the master device does not itself participate in displaying the multi-device display.

After pairing mode is established, each of the display devices 104, 702, and 704 may send a device parameter to the master device. For example, the device parameter may be a bezel dimension, device dimension, screen dimension, pixel size, pixel density, brightness control, available memory size, processor speed, and/or volume control. As another example, the display parameter can indicate the shape of the display screen, e.g., straight or curved, whether or not a bezel is present, etc. The master device 102 may use the device parameter of each of the display devices 104, 702, and 704 in addition to known device parameters of itself, e.g., the first display device 102, to determine a multi-device display configuration. The master device 102 then sends a display indicium to each of the display devices 104, 702, and 704 to allow a user to arrange the positions of the display devices 104, 702, and 704 to provide an optimal multi-device display. Further, the master device 102 itself may display a display indicium for its position within the multi-device display. The display indicium may be a unique image such as a number, letter, arrow, dot, etc. The display devices 102, 104, 702, and 704 each display a corresponding display indicium so that the user is aware of the manner in which to position the display devices 102, 104, 702, and 704 in relation to each other to display the multi-device display configuration.

In a preferred embodiment, the master device 102 determines which portion of the video should be displayed by each display device and sends those portions to the other display devices 104, 702, and 704. This allows the master device 102 to divide the content into portions and lets the other devices 104, 702, and 704 simply display portions of the content. This removes the potential problems of 1) a display device that receives the wrong display data, 2) a display device that doesn't understand or misinterprets the display data, or 3) a display device that doesn't have the proper software or processor power/speed to use the display data.

Alternatively, the master device 102 may provide display data to each of the display devices 104, 702, and 704 that indicate what portions of the multi-device display should be displayed by that device. The master device, e.g., the first display device 102, knows what portion to display itself. For example, the master device may use device parameters such as bezel dimensions to calculate portions for a multi-device display. For instance, the display data for a device may indicate to the corresponding recipient device that certain pixels should be removed from the multi-device display based upon the bezel dimensions, i.e., pixels are removed at the location of the bezel within the multi-device display.

If the display devices 104, 702, and 704 cannot transmit the device parameters to the master device, e.g., the first display device 102, then a user may use the master device to perform an image capture, e.g., a picture, of the display devices 104, 702, and 704. The master device may then use that picture to determine which portions of the multi-device display are to be displayed by which devices, e.g., the first display device 102 should display the top left portion, the second display device 104 should display the top right portion, the third display device 702 should display the bottom left portion, and the fourth display device 704 should display the bottom right portion.

Figure 13:
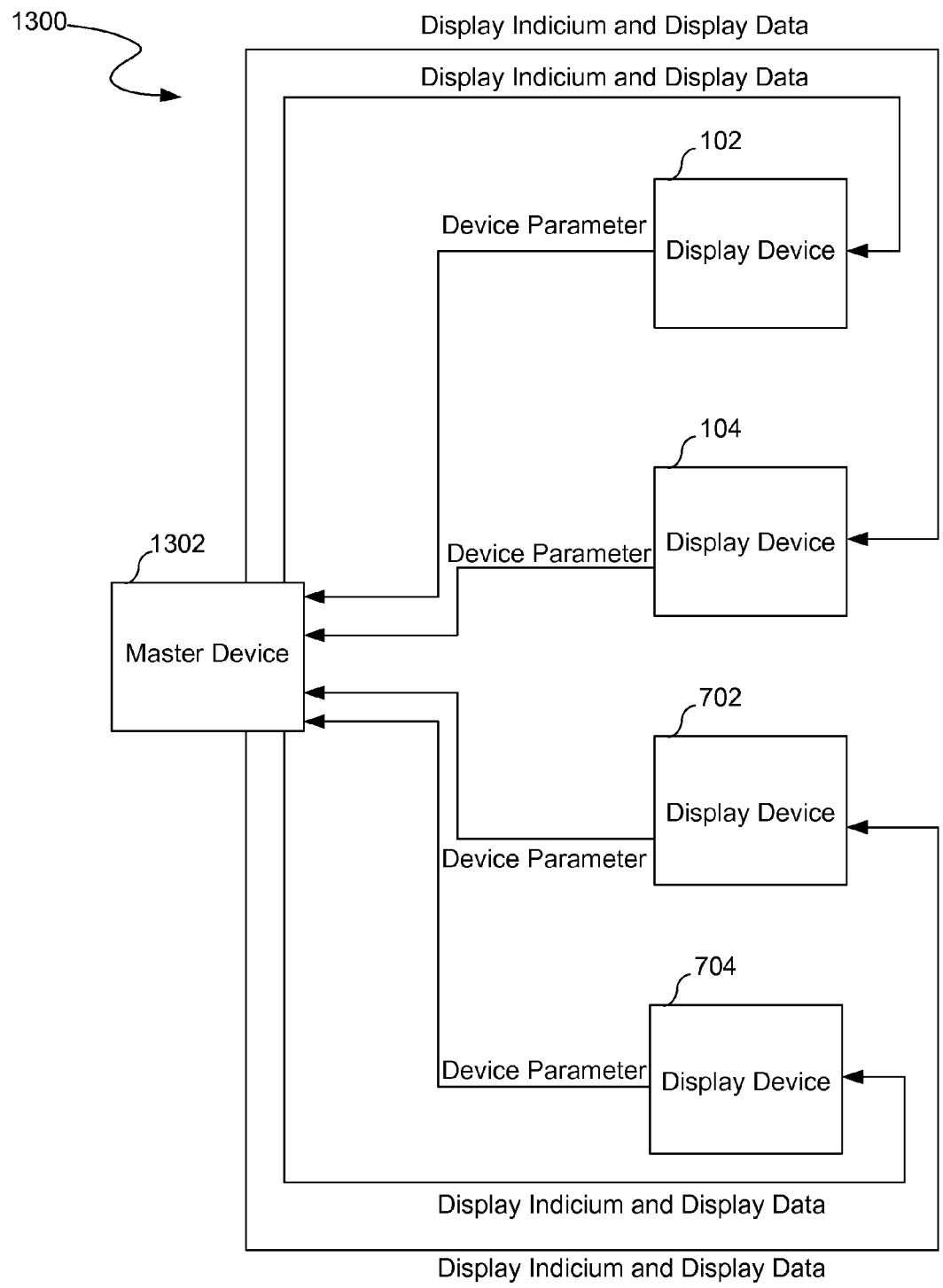
FIG. 13 illustrates a multi-device display configuration in which a device that is distinct from the display devices that participate in the multi-device display acts as a master device.

FIG. 13 illustrates a multi-device display configuration 1300 in which a device 1302 that is distinct from the devices 102, 104, 702, and 704 that participate in the multi-display image acts as a master device. The device 1302 may communicate with the devices 102, 104, 702, and 704 via NFC, Wi-Fi, Bluetooth, or any other communication protocol. For example, the device 1302 may be a wearable computing device, e.g., a smartwatch, that establishes NFC communication with each of the devices 102, 104, 702, and 704 via being within a certain proximity. As an example, a tap may be performed to establish an NFC communication. Accordingly, a tap between the device 1302 and each of the display devices 102, 104, 702, and 704 will invoke a communication such as a transmission or reception of device parameters.

The display data illustrated in FIGS. 12 and 13 can include data other than the content data. For example, the display data may include display settings. The first display device 102 illustrated in FIG. 12 or the master device 1302 illustrated in FIG. 13 may adjust the display settings in addition to indicating which portions of the content should be displayed by which devices. For instance, the first display device 102 illustrated in FIG. 12 or the master device 1302 illustrated in FIG. 13 may adjust the contrast, brightness, and/or color of each display device so that the display devices 102, 104, 702, and 704 provide an optimal multi-device display in unison. As an example, the fourth display device 704 may have high resolution display capabilities, whereas the remaining display devices 102, 104, and 702 may only have low resolution display capabilities. The first display device 102 illustrated in FIG. 12 or the master device 1302 illustrated in FIG. 13 may adjust the contrast, brightness, and/or color of the fourth display device 704 to display the content in low resolution so that the multi-device display uniformly appears in low resolution rather than having different portions that are displayed according to different resolutions.

Although display data is illustrated in FIGS. 12 and 13, the first display device 102 illustrated in FIG. 12 or the master device 1302 illustrated in FIG. 13 may additionally or alternatively provide data other than display data, such as audio content. For example, two of the display devices, e.g., the third display device 702 and the fourth display device 704 may receive audio content rather than video content. As a result, the first display device 102 and the second display device 104 display the multi-display image, whereas the third display device 702 and the fourth display device 704 may act only as audio speakers to play audio content corresponding to the multi-device display. This may provide stereo surround sound audio.

Alternatively, display content and audio content can be sent from the first display device 102 illustrated in FIG. 12 or the master device 1302 to the remaining display devices. Therefore, the first display device 102 illustrated in FIG. 12 or the master device 1302 can provide an optimal multi-device display with optimal corresponding audio.

Figure 14:
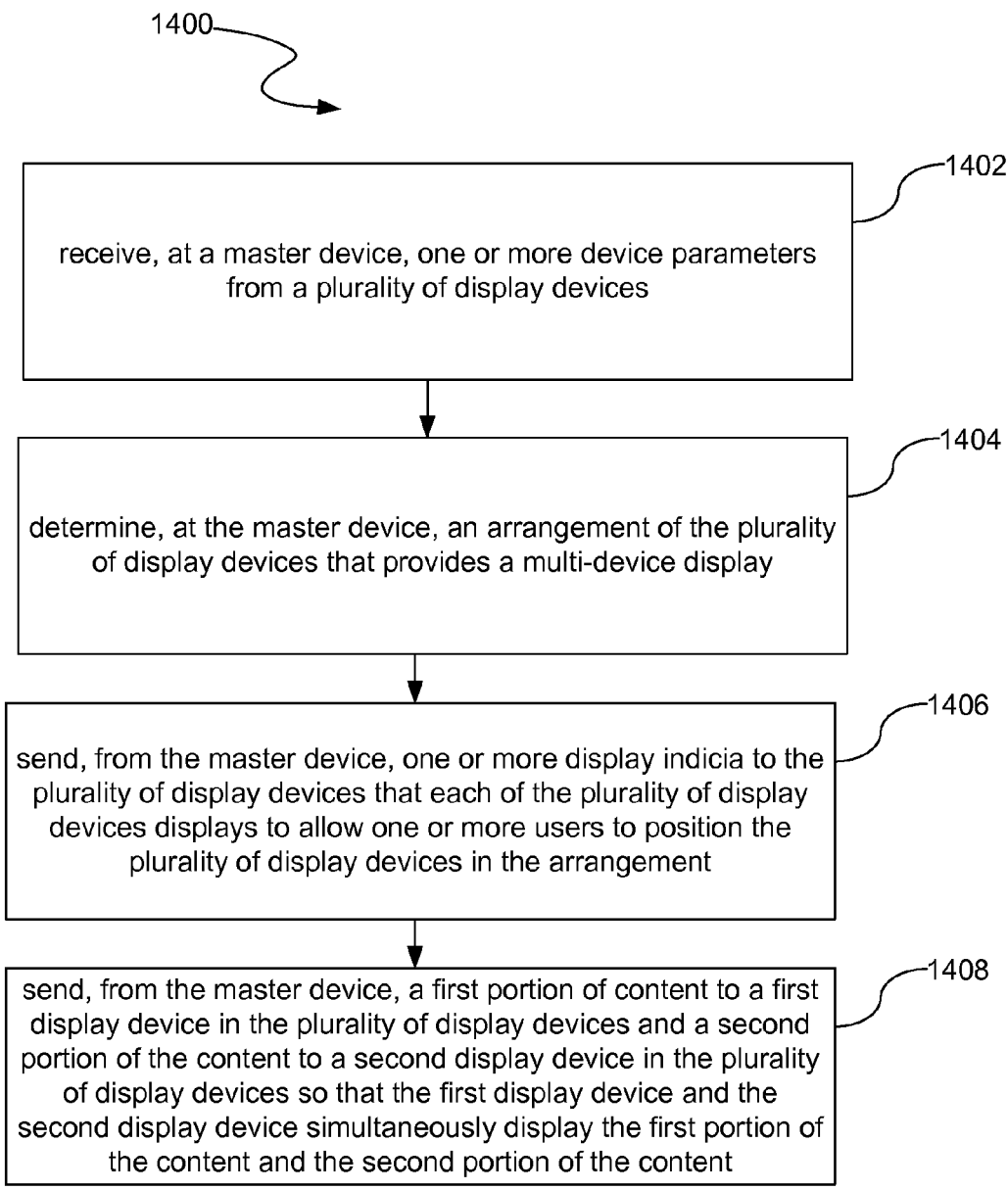
FIG. 14 illustrates a process that may be utilized to provide a multi-device display pairing configuration illustrated in FIG. 12 or the multi-device display configuration illustrated in FIG. 13.

FIG. 14 illustrates a process 1400 that may provide a multi-device display pairing configuration 1200 illustrated in FIG. 12 or the multi-device display configuration illustrated in FIG. 13. At a process block 1402, the process 1400 receives, at a master device, one or more device parameters from a plurality of display devices 102, 104, 702, or 704. Further, at a process block 1404, the process 1400 determines, at the master device, an arrangement of the plurality of display devices 102, 104, 702, or 704 that provides a multi-device display. In addition, at the process block 1406, the process 1400 sends, from the master device, one or more display indicia to the plurality of display devices that the plurality of display devices displays to allow one or more users to position the plurality of display devices in the arrangement. In addition, at the process block 1408, the process 1400 sends, from the master device, a first portion of content to a first display device in the plurality of display devices and a second portion of the content to a second display device in the plurality of display devices so that the first display device and the second display device simultaneously display the first portion of the content and the second portion of the content. Alternatively, the process 1400 sends, from the master device, display data to the plurality of display devices 102, 104, 702, or 704 that allow the plurality of display devices 102, 104, 702, or 704 to display corresponding portions of content for the multi-device display based upon the arrangement.

Figure 15:
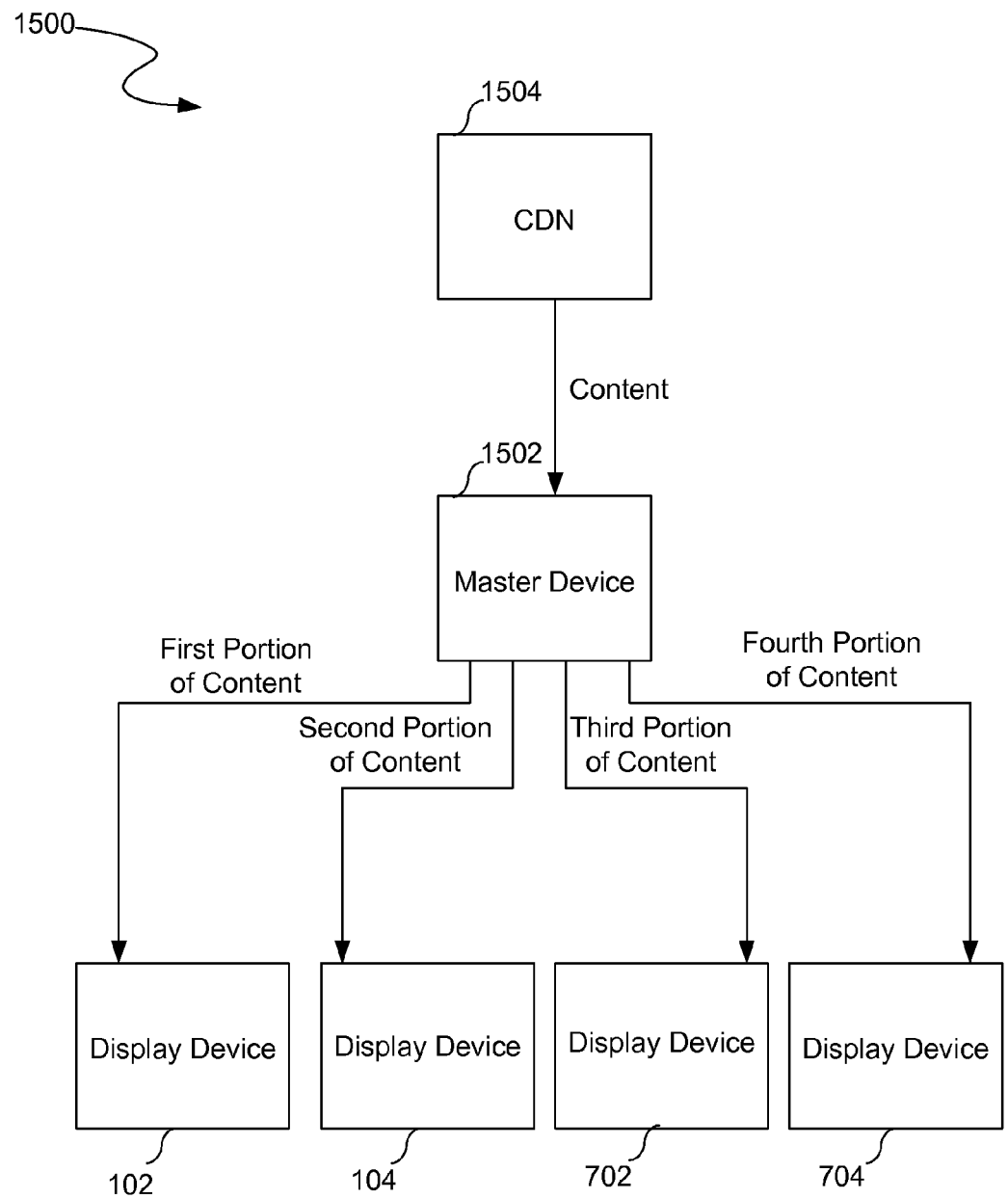
FIG. 15 illustrates a content delivery configuration that may be used to deliver content, e.g., via streaming, downloading, etc., to a device that is associated with a user account.

FIG. 15 illustrates a content delivery configuration 1500 that may be used to deliver content, e.g., via streaming, downloading, etc., to a device that is associated with a user account, such as an online account to access a permanent and/or temporary collection of digital movies and/or shows. For instance, the device that is associated with the user account may be a master device 1502, such as the first display device 102 illustrated in FIG. 12 or the master device 1302 illustrated in FIG. 13.

The master device 1502 may receive the content, e.g., from a content server via a content distribution network ("CDN") 1504. The master device 1502 then controls the display of the multi-device display of the display devices 102, 104, 702, and 704. The master device 1502 may use the device parameters received from the display devices 102, 104, 702, and 704 to determine the multi-device display.

In one aspect, the master device 1502 interacts with the CDN 1504 via a software application. For example, a user may logon to a user account of the CDN 1504 (provide a user name and password, or a biosignature such as retina scan or fingerprint scan) via a software application invoked by a computing device. The display devices 102, 104, 702, and 704 may also use the same software application.

The master device 1502 then controls the multi-device display provided by the display devices 102, 104, 702, and 704 via the software application. For instance, the master device 1502 may share the content with the display devices 102, 104, 702, and 704 via the software application by granting access to that content. The master device 1502 may determine which portion of the video should be displayed by each display device and sends those portions to the other display devices 102, 104, 702, and 704. Alternatively, the master device 1502 may send display data to the display devices 102, 104, 702, and 704 that instruct the display devices 102, 104, 702, and 704 to only render certain portions of the content, e.g., particular pixel data, based upon the device parameters for the multi-device display. In another aspect, the master device 1502 sends one or more authorization codes to the display devices 102, 104, 702, and 704 to grant access to the content to the display devices 102, 104, 702, and 704.

If the master device 1502 moves out of range of a predetermined proximity to the display devices 102, 104, 702, and 704, such as 1-3 feet, which may be determined by a communication protocol such as NFC, the access to the content granted to the display devices 102, 104, 702, and 704 may be terminated, so that the display devices 102, 104, 702, and 704 would not be able to display corresponding portions of the content. A software application stored on the display devices 102, 104, 702, and 704 may then provide an offer to the display devices 102, 104, 702, and 704 so that the remaining users may buy or rent the content. Further, a security feature may be used to prevent copying of the content onto the display devices 102, 104, 702, and 704, so that the display devices 102, 104, 702, and 704 either have to be in communication with or in proximity to the master device 1502 or have to send an order to buy or purchase the content.

If one of the remaining users also has a user account with access to the content via the CDN 1504, then that user may establish a device associated with that user as the master device 1502. That master device 1502 may then obtain the content via the CDN 1504 and obtain the device parameters from the remaining display devices to determine a multi-device display and distribute corresponding portions of the content and/or access to the corresponding portions of the content.

Figure 16:
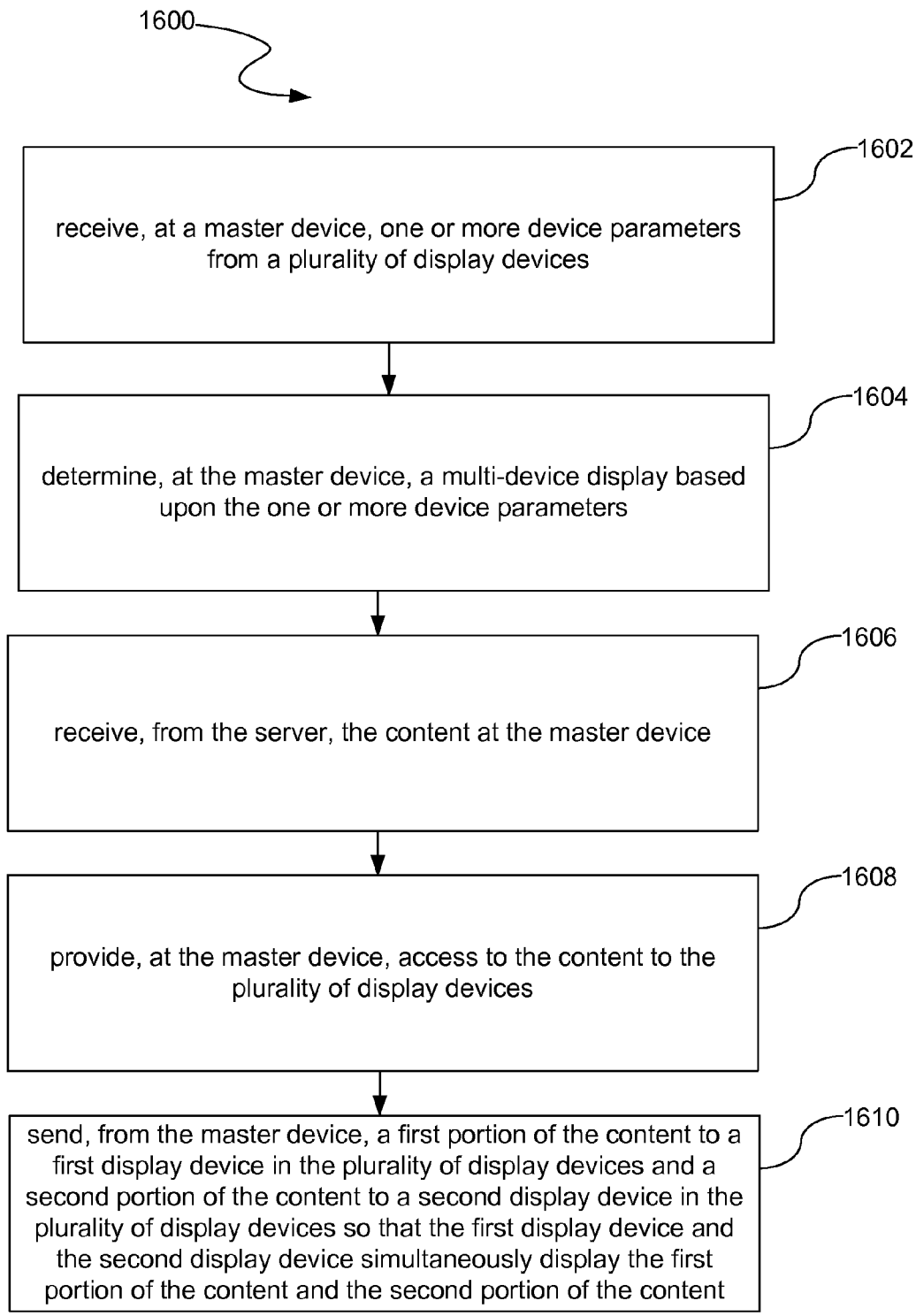
FIG. 16 illustrates a process that may be used to provide the content delivery configuration illustrated in FIG. 15.

FIG. 16 illustrates a process 1600 that may be used to provide the content delivery configuration 1500 illustrated in FIG. 15. At a process block 1602, the process 1600 receives, at the master device 1502, one or more device parameters from a plurality of display devices 102, 104, 702, and 704. The master device 1502 is associated with a user account that provides access to content from a server. Further, at a process block 1604, the process 1600 determines, at the master device 1502, a multi-device display based upon the one or more device parameters. In addition, at a process block 1606, the process 1600 receives, from the server, the content at the master device 1502. At a process block 1608, the process 1600 also provides, at the master device, access to the content to the plurality of display devices 102, 104, 702, and 704. Further, at a process block 1610, the process 1600 sends, from the master device 1502, portions of the content for each display device to display. Alternatively, the process sends, from the master device 1502, display data to the plurality of display devices 102, 104, 702, and 704 that indicates which portion of the content each of the plurality of display devices 102, 104, 702, and 704 should display as part of the multi-device display.

Figure 17:
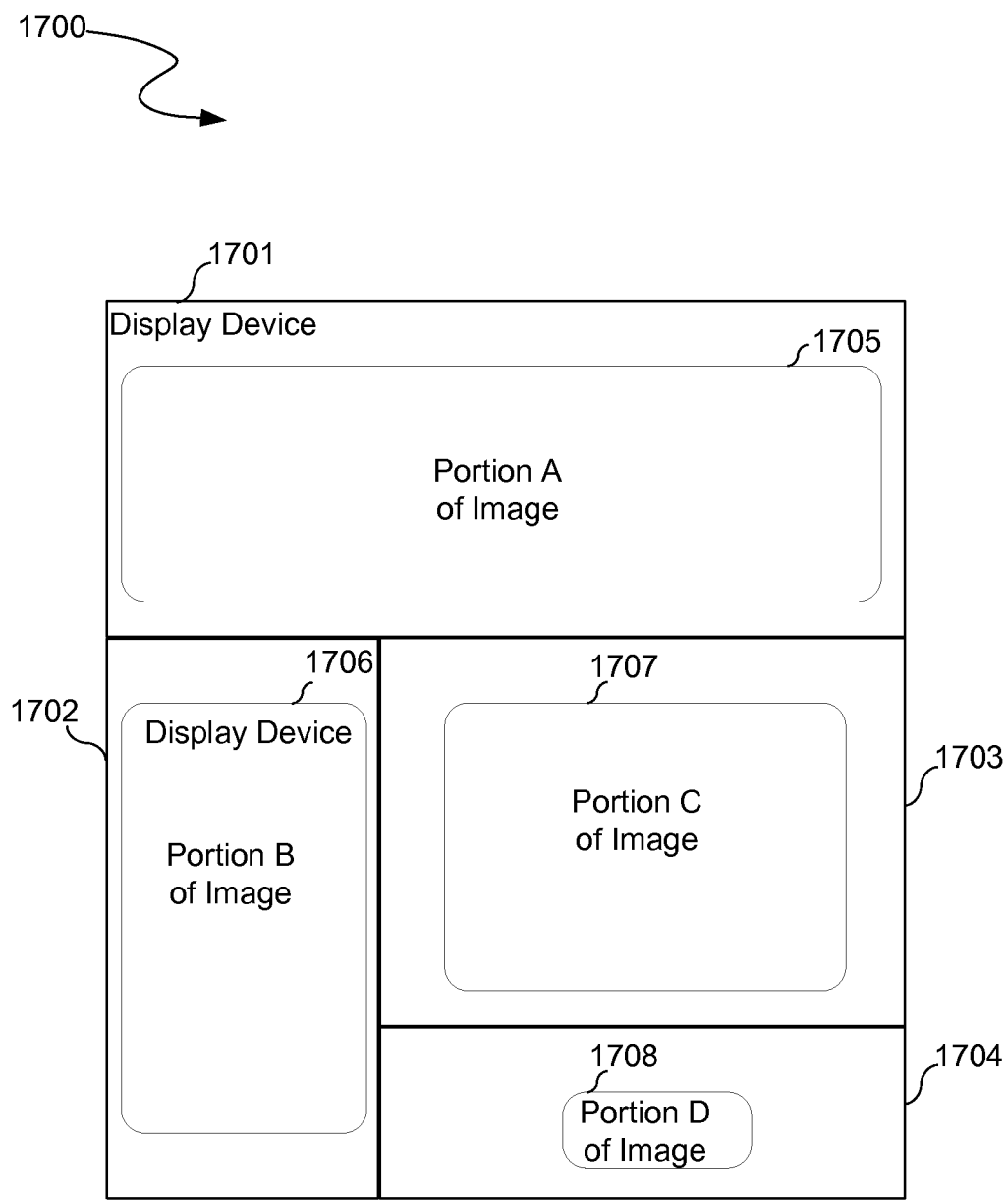
FIG. 17 illustrates a multi-device display configuration.

Although devices of similar dimensions and shapes, e.g., devices 102 and 104, are illustrated in FIG. 3, devices of varying dimensions and shapes may be used as an alternative. FIG. 17 illustrates a multi-device display configuration 1700. The multi-device display configuration 1700 has a first display device 1701, a second display device 1702, a third display device 1703, and a fourth display device 1704 that each has a different set of dimensions and may have a different shape from the remaining devices. The first display device 1701 has a first display 1705 that displays a first portion of the image, the second display device 1702 has a second display 1706 that displays a second portion of the image, the third display device 1703 has a third display 1707 that displays a third portion of the image, and the fourth display device 1704 has a fourth display 1708 that displays a fourth portion of the image.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A method comprising:

receiving, at a master device, one or more device parameters from a plurality of display devices;

determining, at the master device, an arrangement of the plurality of display devices that provides a multi-device display;

sending, from the master device, a message to at least one of the plurality of display devices, the message comprising data indicating relative positioning of a side of said at least one of the plurality of display devices to a side of the master device;

sending, from the master device, one or more display indicia to the plurality of display devices that each of the plurality of display devices displays to allow one or more users to position the plurality of display devices in the arrangement;

sending, from the master device, a first portion of content to a first display device in the plurality of display devices and a second portion of the content to a second display device in the plurality of display devices so that the first display device and the second display device simultaneously display the first portion of the content and the second portion of the content;

terminating the display of the first portion of the content by the first display device based on a distance between the master device and the first display device exceeding a predetermined proximity during active communication between the master device and the first display device; and terminating the display of the second portion of the content by the second display device based on a distance between the master device and the second display device exceeding the predetermined proximity during active communication between the master device and the second display device, wherein a software application stored on said at least one of the first display device and the second display device provides an offer to buy or rent the content after the termination of the access to the content.

2. The method of claim 1, wherein the master device is one of the plurality of display devices.

3. The method of claim 1, wherein the master device is a device that is distinct from the plurality of display devices.

4. The method of claim 1, wherein the master device establishes communication with the plurality of display devices through a wireless pairing protocol.

5. The method of claim 1, wherein the one or more device parameters are selected from the group consisting of: a bezel dimension, a display screen dimension, a pixel density, a display screen contrast, a display screen brightness, and an audio volume associated with a display screen.

6. The method of claim 1, wherein the one or more display indicia are selected from the group consisting of: a number, a letter, and an arrow.

7. The method of claim 1, wherein the first portion of the content is based on a location of the first display device with respect to the second display device.

8. The method of claim 1, wherein the first display device and the second display device have different dimensions.

9. The method of claim 1, further comprising performing, with the master device, one or more image captures of the plurality of display devices.

10. The method of claim 9, wherein the one or more device parameters are received via the one or more image captures.

11. A method comprising:

receiving, at a master device, one or more device parameters from a plurality of display devices, the master device being associated with a user account that provides access to content from a server;

determining, at the master device, a multi-device display based upon the one or more device parameters;

sending, from the master device, a message to at least one of the plurality of display devices, the message comprising data indicating relative positioning of a side of said at least one of the plurality of display devices to a side of the master device;

receiving, from the server, the content at the master device;

providing, at the master device, access to the content to the plurality of display devices;

sending, from the master device, a first portion of the content to a first display device in the plurality of display devices and a second portion of the content to a second display device in the plurality of display devices so that the first display device and the second display device simultaneously display the first portion of the content and the second portion of the content; and terminating, at the master device, the access to the content to at least one of the first display device and the second display device based on a distance between the master device and said at least one of the first display device and the second display device exceeding a predetermined proximity during active communication between the master device and said at least one of the first display device and the second display device, wherein a software application stored on said at least one of the first display device and the second display device provides an offer to buy or rent the content after the termination of the access to the content.

12. The method of claim 11, wherein each of the plurality of display devices accesses the content via a software application that is used by the master device to access the content received from the server.

13. The method of claim 11, further comprising providing, from the master device, to the plurality of display devices one or more authorization codes that provide the access to the content.

14. The method of claim 11, wherein a master proximity-based device within the master device detects the presence of one or more additional proximity-based devices within the plurality of display devices and receives the one or more device parameters based upon the detection, the presence being within a proximity.

15. The method of claim 11, wherein the master device establishes communication with the plurality of display devices through a wireless pairing protocol.

16. The method of claim 11, wherein the master device is one of the more display devices.

17. The method of claim 11, wherein the master device is a device that is distinct from the one of the more display devices.

18. The method of claim 11, wherein the first portion of the content is based on a location of the first display device with respect to the second display device.

19. The method of claim 11, wherein said at least one of the first display device and the second display device prevents copying of the content, via a security feature, prior to the termination.

* * * * *